US00RE40429E

(19) United States
(12) Reissued Patent
Oliver et al.

(10) Patent Number: US RE40,429 E
(45) Date of Reissued Patent: Jul. 15, 2008

(54) BORE SIGHT

(76) Inventors: Keith Oliver, 65 Rocky Cir., Cartersville, GA (US) 30184; Chung T. Cheng, 349 Dewpoint La., Alpharetta, GA (US) 30022

(21) Appl. No.: 11/227,953

(22) Filed: Sep. 14, 2005

Related U.S. Patent Documents

Reissue of:
(64) Patent No.: 6,622,414
Issued: Sep. 23, 2003
Appl. No.: 10/173,448
Filed: Jun. 18, 2002

(51) Int. Cl.
*F41G 1/00* (2006.01)

(52) U.S. Cl. ..... 42/116; 42/117; 362/205; 362/206

(58) Field of Classification Search ..... 42/116, 42/117; 362/205, 206
See application file for complete search history.

(56) References Cited

U.S. PATENT DOCUMENTS

| | | | |
|---|---|---|---|
| 5,279,061 | A | 1/1994 | Betz et al. |
| 5,365,669 | A | 11/1994 | Rustick et al. |
| 5,488,795 | A | 2/1996 | Sweat |
| 5,531,040 | A | 7/1996 | Moore |
| 5,685,106 | A | 11/1997 | Shoham |
| 5,787,631 | A | 8/1998 | Kendall |
| 6,216,381 | B1 | 4/2001 | Strand |
| 6,295,753 | B1 | 10/2001 | Thummel |
| 6,389,730 | B1 | 5/2002 | Millard |
| 2002/0129536 | A1 | 9/2002 | Iafrate et al. |

FOREIGN PATENT DOCUMENTS

| | | | |
|---|---|---|---|
| WO | WO 00/70293 | A1 | 11/2000 |

*Primary Examiner*—Michael R. Monsen
*Assistant Examiner*—Gabriel J Klein
(74) *Attorney, Agent, or Firm*—Baker Donelson

(57) ABSTRACT

A laser bore sight (10) is disclosed hollow, outer housing (11) having an internally threaded, rear portion (14), and a threaded end cap (17) is sized and shaped to be threaded to the housing rear portion (14). The end cap (17) includes a threaded, tubular stem (18) having an annular rim (18'), an electrically insulative spacer (20) and a spring (21). The bore sight (10) also includes a laser diode (24), lens (25), a series of three batteries (26), an electrically conductive spring (27), and an electrical conductor. The end cap (17) is movable between an extended position with the spacer protruding from the end of the stem (18) and a retracted position with the spacer recessed within the stem so as to allow the battery to electrically contact the end cap.

16 Claims, 2 Drawing Sheets

BORE SIGHT

Matter enclosed in heavy brackets [ ] appears in the original patent but forms no part of this reissue specification; matter printed in italics indicates the additions made by reissue.

TECHNICAL FIELD

This invention relates to bore sights, and specifically to laser bore sight activation switches.

BACKGROUND OF THE INVENTION

It has been well known to provide rifles or pistols with sights to guide the operator in aiming the firearms. High power scopes are often utilized to provide an accurate sight at most ranges. The scope is mounted on the top of the firearm to provide a magnified view of the potential target when sighted. Cross hairs within the scope are used to sight the target, with the intersection of the cross hairs being placed exactly on the intended target. Limitations of the high powered scope include the problem that the scope must be "calibrated" to assure accuracy. Typically, adjusting screws are provided which can be used to adjust the scope so that the cross hairs are accurately marking the target. If a rifle, for example, was mounted on a stand and the target sighted in the cross hairs of the scope, minor adjustments of the scope may be necessary to assure accuracy. Adjustments are made by firing a round of ammunition and noting where the round strikes with respect to the target. Mechanical adjustment of the scope can then be made to align the cross hairs of the scope with the actual point at which the round of ammunition struck the target. It may take several attempts of this trail and error firing of the rifle and adjusting the scope to bring the cross hairs in line with the actual striking point of the ammunition round. As can be expected, this procedure, even when performed by a skilled marksman, is time consuming and inherently imprecise.

Designers have adapted lasers to aid in the sighting process of a firearm. Some lasers have been designed to be mounted to the top of the barrel. However, oftentimes the path of the ammunition round does not follow the exact path of the laser's light. As such, even when one finally aligns the scope with the laser beam the scope is still misalinged with the round's path. To alleviate this problem, lasers have been designed to be mounted within the barrel of a rifle to more accurately depict the path of the round. Some of these lasers have been positioned within the end of the barrel. These lasers however do not always align with the ammunition's path of travel. To provide more accuracy, lasers have been designed to include a housing configured to be mounted within the breech or chamber of the barrel. With the laser positioned within this area the light from the laser generally follows the bore of the barrel and thus the path of the ammunition. Of course, the laser diode within the housing may have to be adjusted so that the light does indeed travel along the bore of the barrel.

A problem with these devices has been their ability to incorporate an on/off or activation switch. The front end of such laser bore sight must include the laser diode, which obviously can not be obstructed by a switch. The side walls of the laser bore sights are designed to rest within the same sized bore of the gun barrel or breach. As such, the side housing can not include a switch which would interfere with the proper seating of the laser bore sight within the rifle bore.

Some laser bore sights having included a switch at the rear end of the sight which is activated by the hammer or firing pin of the gun pressing upon a switch, as shown in U.S. Pat. Nos. 5,365,669 and 5,787,631. A problem associated with this type of switch is that the operator may be under the false impression that the laser is not activate when in reality it is activated by the pressing of the firing pin. This results in the laser not being deactivated and therefore continuing to operate until the battery is exhausted. Moreover, the harsh hitting of the hammer or firing pin upon the switch may cause damage to the switch or laser diode as a result of the impact or resulting vibration.

Laser bore sights have also been developed wherein the activation of the sight is caused by the positioning of the bore sight within the bore. Here, the metal housing of the laser bore sight contacts the metal barrel of the gun while a second portion of the laser bore sight contacts another metal portion of the gun in order to close the power circuit, i.e. the gun itself creates a conductive pathway or bridge which closes the power circuit so as to activate the laser diode. This concept is shown in U.S. Pat. No. 5,465,669. However, once again, the operator may be under the impression that the laser is only activated when the sighting process is underway, and may not realize that the laser is still activated afterwards. Also, here again, a portion of the switch contacts the hammer or firing pin of the gun, which may cause damage to the delicate components of a laser.

Accordingly, it is seen that a need remains for a laser bore sight which is not automatically turned on when it is placed within a gun and which does not include a switch that will be activated by the striking hammer or firing pin of a gun. It is to the provision of such therefore that the present invention is primarily directed.

SUMMARY OF THE INVENTION

In a preferred form of the invention a bore sight comprises a tubular housing having an electrically conductive portion, a laser mounted to one end of the housing in electrical contact with the housing conductive portion, at least one battery mounted in the housing electrically coupled with the laser, and an end cap movably mounted to the other end of the hosing and in electrical contact with the housing electrically conductive portion for movement between an extended, switch-off position and a retracted, switch-on position, the end cap having an electrically conductive, tubular end positioned adjacent the battery, a spring mounted within the end cap tubular end, and an insulated spacer mounted within the end cap tubular end for reciprocal movement between a switched-off position protruding out of the end cap tubular end spacing the end cap electrically conductive, tubular end from the battery and a switched-on position recessed within the end cap tubular end with the electrically conductive tubular end in engagement with the battery.

DETAILED DESCRIPTION

Figure 1:
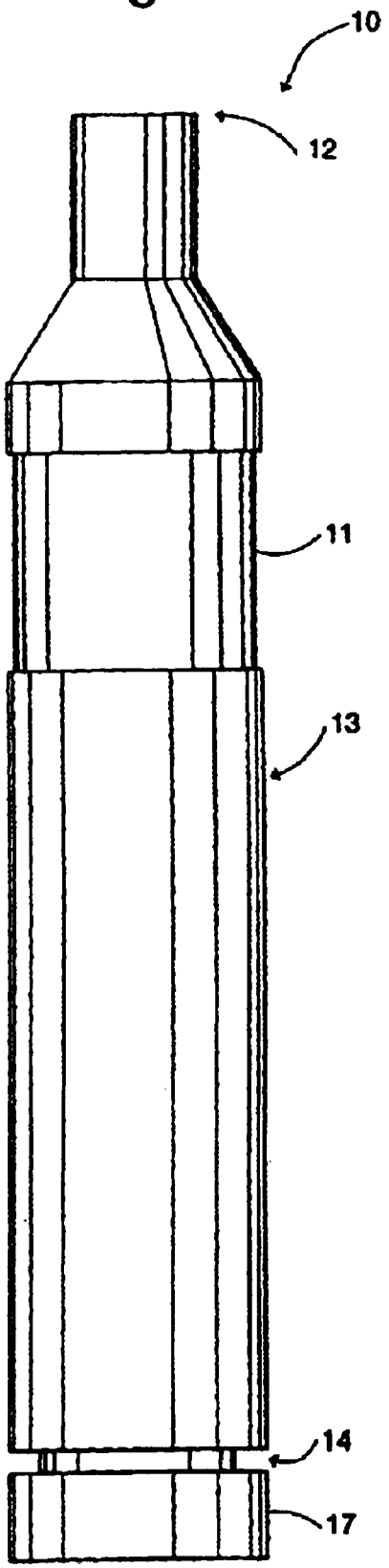
FIG. 1 is a side view of a laser bore sight embodying principles of the invention in a preferred form.
Figure 2:
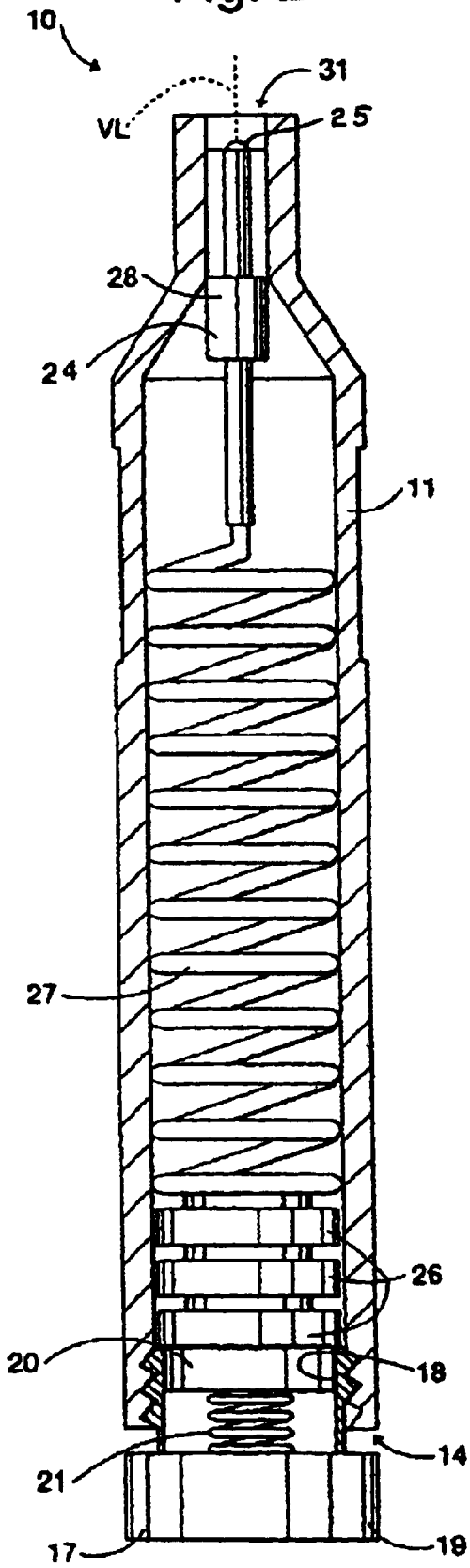
FIG. 2 is a cross-sectional side view of the laser bore sight of FIG. 1.

With reference next to the drawings, there is shown a laser bore sight 10 in a preferred form of the invention. The bore sight 10 is designed to be utilized within a gun for use in conjunction with the sighting-in of a sighting device such as a scope mounted to the gun. The bore sight 10 has a tubular, outer housing 11 configured to be received in the breach or chamber of a gun. It should be noted that the configuration of the housing 11 is determined by the caliber of the gun. The housing 11 has a front portion 12, a middle portion 13 and an internally threaded, rear portion 14. A threaded end cap 17 is sized and shaped to be threadably received within the housing rear portion 14.

The end cap 17 includes an externally threaded, tubular end or stem 18 having an annular rim 18', an end plate 19, a cup-shaped, electrically insulative spacer 20 and a spring 21 mounted to and between the spacer 20 and the end plate 19. The spring 21 biases the spacer 20 between an extended, switch-off position protruding from the stem 18, shown in FIG. 3, and a retracted, switch-on position recessed within the stem 18, shown in FIG. 4.

The bore sight 10 also includes a laser diode 24, lens 25, a series of three batteries 26, an electrically conductive spring 27, and an electrical conductor 28. Here, the electrical conductor 28 is in the form of an annular housing in direct contact with housing 11. The laser diode 24 and lens 25 are mounted within the front portion 12 so as to generate and direct a visible light beam VL of collimated light through a front opening 31 in the front portion 12. The three batteries 26 are mounted in series within the middle portion 13 of the housing with the spring 27 extending between the laser diode 24 and the batteries 26 so as to bias the batteries towards the end cap 17. The spring 27 also acts as a conductor and is coupled to the circuitry of the laser diode so to provide current from the batteries 26 to the laser diode 24. The conductor 28 extends between and in electrical communication with the housing 11 and the circuitry of the laser diode.

Figure 3:
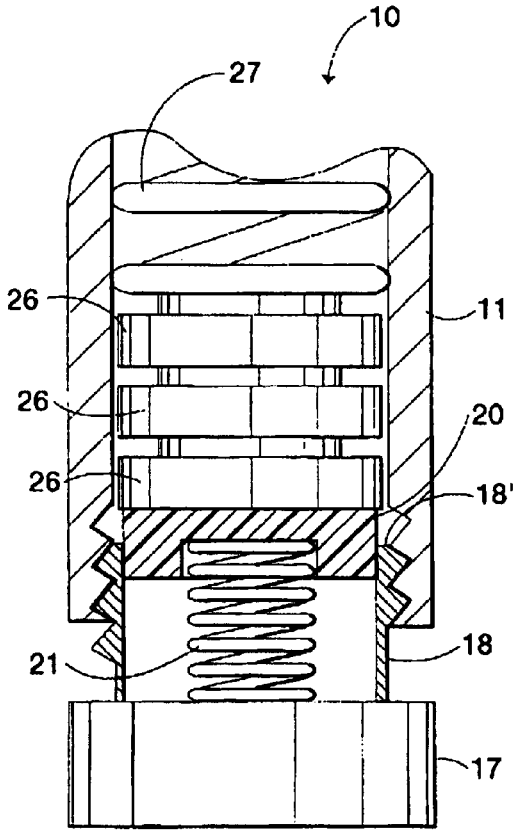
FIG. 3 is a cross-sectional side view of a portion of the laser bore sight of FIG. 1 in a de-activated mode.

In use, with the end cap 17 in its extended, switch-off position threaded partially within the rear portion 14 of the housing 11, shown in FIG. 3, the spring 21 biases the spacer 20 to a position protruding from the stem 18 so that the last battery 26 does not contact the rim 18' of the end cap 17. With the end cap 17 positioned in this manner the batteries 26 do not provide electric current from the battery to the laser diode 24, and thus the bore sight 10 is not activated.

Figure 4:
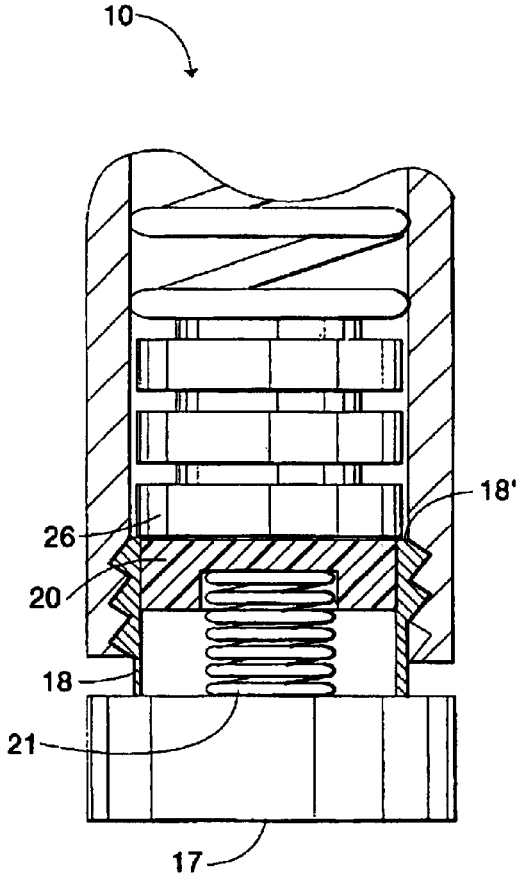
FIG. 4 is a cross-sectional side view of a portion of the laser bore sight of FIG. 1 in an activated mode.

To activate the bore sight 10 the end cap 17 is threaded further into the rear portion 14 of the housing 11 to its retracted, switch-on position, as shown in FIG. 4. As the end cap 17 is threaded into the rear portion the biasing force of the spring 21 is overcome and the insulative spacer 20 is pushed into the interior space of the stem 18. The positive electrode end of the last battery 26 thereby comes into electrical contact with the rim 18' of the end cap stem 18. The contact of the battery 26 with the end cap 17 completes an electric circuit between the batteries 26 and the laser diode 24 with the electrical current flowing through the housing 11 and end cap 17. Specifically, the batteries 26 are coupled to the laser diode 24 by spring 27 extending between the negative electrode of the batteries 26 and the laser diode, and from the positive electrode of the batteries through the end cap 17, the housing 11 in electrical contact with the end cap 17, and the conductor 28 in electrical contact with the housing 11 and the laser diode. As such, the current from the batteries 26 passes to the laser diode thereby energizing the laser diode to produce a "red dot" light beam or collimated, visible light beam VL.

The bore sight 10 is then positioned within the chamber of the gun where a conventional ammunition cartridge is normally positioned for firing. The visible light beam VL is directed through the bore of the barrel and is impinged upon a distant target. The use observes the location of the "red dot" or light beam upon the target and accordingly adjusts the sighting device to coincide with this location. The bore sight is then ejected from the gun and an live ammunition cartridge is inserted into the chamber. The gun is then fired from the same location to insure that the sight is accurate.

The end cap 17 may be rotated so as to be threaded off the rear portion 14 of the housing. With the end cap 17 removed from the housing in this manner the batteries are exposed and may be removed and replaced through the opening in the rear portion 14.

It should be understood that any type of light may be used in the present invention, inclusive of light which may be within or outside the visible spectrum, such as white light, ultraviolet light, or infrared light. It should be noted however that the user of light outside the visible spectrum would require additional equipment in order to view the light upon the target. As used herein the terms laser, laser diode and laser module are synonymous.

It should be understood that as an alterative to the metallic housing shown in the preferred embodiment, the bore sight may include a housing wherein only a portion of the housing is electrically conductive or which may include a conductor extending between the rear end of the housing and the laser diode. As such, the housing need only be partially conductive, meaning it includes at least a conductive portion.

It should be understood that the end cap may also be designed to be reciprocally pushed or pulled between two positions rather than the threaded movement shown in the preferred embodiment. It should also be understood that as an alternative to the electrically insulative spacer 20 an electrically insulative shied may be placed between the spring 21 and the end plate 19.

It should also be noted that in the present invention the bore sight is only activated by manually threading the end cap. As such, the possibility of unwantedly activating the bore sight through the mere positioning of the bore sight within a gun is eliminated. Furthermore, as the present bore sight does not involve the use of the gun's firing pin or hammer the resulting damage from the striking of such is also eliminated.

It thus is seen that a laser bore sight is now provided which overcomes problems with those of the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. A bore sight comprising:

(a) a tubular housing having an electrically conductive portion;

(b) a laser mounted to one end of said housing in electrical contact with said housing conductive portion;

(c) at least one battery mounted in said housing electrically coupled with said laser, and (d) an end cap movably mounted to the other end of said housing and in electrical contact with said housing electrically conductive portion for moment between an extended, switch-off position and a retracted, switch-on position, said end cap having an electrically conductive, tubular end positioned adjacent said battery, a spring mounted within said end cap tubular end, and an insulated spacer mounted within said end cap tubular end for reciprocal movement between a switched-off position protruding out of said end cap tubular end spacing said end cap eclectically conductive, tubular end from said battery and a switched-on position recessed within said end cap tubular end with said electrically conductive tubular end in engagement with said battery.

2. The bore sight of claim 1 wherein said end cap may be moved to a detached position separated from said housing for access to said battery.

3. A bore sight comprising:

(a) a partially conductive housing;

(b) a laser diode mounted within said housing;

(c) at least one battery mounted within said housing to energize said laser diode when an electrically conductive flow-path is completed with the laser diode, and (d) an electrical circuit which electrically couples said battery with said laser diode, said electrical circuit including said partially conductive housing and an end cap, said end cap having an annular stem portion in electrical contact with said housing, a spring coupled to said annular stem and an insulative spacer coupled to said spring, said end cap being movable between an extended position wherein said spring and spacer bias said battery to a position separated from said annular stem portion and a retracted position wherein the biasing force of the spring is overcome and the battery contacts said stem portion to create a flow path through said stem portion and said housing.

4. The bore sight of claim 3 wherein said end cap may be moved to a detached position separated from said housing for access to said battery.

5. The bore sight of aim 3 wherein said spacer is positioned between said spring and battery.

6. The bore sight of claim 3 wherein said electrical circuit further comprises an electrically conductive spring coupled to and extending between said laser diode and said battery.

*7. A bore sight comprising:*

*a tubular housing having an electrically conductive portion;*

*a laser mounted to one end of said housing in electrical contact with said housing conductive portion;*

*at least one battery mounted in said housing electrically coupled with said laser, and*

*an end cap mounted to the other end of said housing, said end cap having first portion in electrical contact with said housing electrically conductive portion and an electrically insulative second portion mounted for movement relative to said first portion between a first position wherein said second portion prevents a complete electric circuit between said laser and said battery and a second position wherein said second portion allows a complete electric circuit between said laser and said battery.*

*8. The bore sight of claim 7 wherein said first portion is a threaded stem.*

*9. The bore sight of claim 7 wherein said second portion is an insulated spacer.*

*10. The bore sight of claim 9 wherein said first portion is a threaded stem.*

*11. The bore sight of claim 10 further comprising a spring biasing said spacer from said stem.*

*12. The bore sight of claim 10 wherein said stem is threadably received within said tubular housing conductive portion.*

*13. The bore sight of claim 12 wherein the threaded movement of said stem within said tubular housing causes the movement of said second portion between said first position and said second position.*

*14. A bore sight comprising:*

*a partially conductive housing;*

*a laser diode mounted to said housing;*

*at least one battery mounted within said housing to energize said laser diode when an electrically conductive flow-path is completed with the laser diode, and*

*an electric circuit which electrically couples said battery with said laser diode, said electrical circuit including said partially conductive housing and an end cap, said end cap having an electrically conductive threaded stem, an electrically insulative spacer, and a spring biasing said spacer from said stem, said electrically insulative spacer being moveable relative to said electrically conductive threaded stem between a circuit completing position wherein a complete electrically conductive flow-path is established between the battery and the laser diode and a circuit incomplete position wherein an electrically conductive flow-path is not established between the battery and the laser diode.*

*15. The bore sight of claim 14 wherein said stem is threadably received within said housing.*

*16. The bore sight of claim 15 wherein the threaded movement of said stem within said housing causes the movement of said electrically conductive portion between said circuit completing position and said circuit incomplete position.*

* * * * *